2,837,491

PROCESS FOR RAISING THE SOFTENING POINT OF HYDROCARBON RESINS AND PRODUCT PRODUCED THEREBY

John F. McKay, Jr., Cranford, N. J., assignor to Esso Research and Engineering Company, a corporation of Delaware No Drawing. Application October 20, 1953
Serial No. 387,310

10 Claims. (Cl. 260—27)

This invention relates to a method for improving the properties of hydrocarbon resins and more particularly relates to a method of improving the softening properties of olefin-diolefin resins.

It is known that hydrocarbon resins can be produced from certain refinery streams containing olefins and diolefins by a variety of methods, such as polymerization, using Friedel-Crafts catalysts. The resins produced, however, have softening points that are generally too low for certain applications. For use as the binding ingredient in floor tile, for example, it is desirable that hydrocarbon resins have softening points of about 102° C. or greater so that the floor tiles made therefrom have good hardness-indentation properties. Most of the resins that are produced from such hydrocarbon streams by Friedel-Crafts polymerization have softening points lower than 100° C. Heretofore, all attempts to raise the softening points of these resins have seriously degraded the color of the resins. This is undesirable since light colored resins are premium materials. It has now been discovered that at least 10%, preferably 20% to 50% of the resinates of zinc, calcium, magnesium and aluminum have a surprisingly beneficial effect on the softening point of hydrocarbon resins without seriously causing loss of color. By the process of this invention, the usually low softening hydrocarbon resins have their softening points raised so that they become suitable for use in floor tile and other places where high softening point is required.

Hydrocarbon resins to which the present invention is applicable are made by treating a hydrocarbon mixture containing 10 to 35% diolefins and 30 to 65% olefins and 0 to 60% of aromatics, paraffins, and naphthenes with 0.25–2.5% of a Friedel-Crafts type catalyst such as aluminum chloride, aluminum bromide, boron trifluoride, and the like or solutions, slurries or complexes thereof. The reactions are conducted at temperatures in the range of −100 to +100° C. (preferably −35 to +85° C.). Residual catalyst is quenched by suitable methods, such as addition of methyl alcohol and subsequent filtration, water and/or caustic washing and the final solution is then stripped of unreacted hydrocarbons and low molecular weight oils by vacuum or steam distillation. The product is a substantially non-aromatic unsaturated hydrocarbon resin and is therefore essentially an olefin-diolefin polymerization product. A hydrocarbon mixture suitable for resin production is conveniently found in hydrocarbon streams obtained by steam cracking gas oils. These streams have boiling ranges between 20° and 280° C., or may be composed of any intermediate fraction. A typical stream shows 20% diolefins, 51% olefins, 27% aromatics, and 2% paraffins and naphthenes.

The metal resinates useful for improving the softening point of the above resins in accordance with the present invention are produced by treating wood rosin with the desired metal oxide. Zinc, aluminum, magnesium and calcium resinates are the only metal resinates suitable for this invention since other resinates color the final resin too much.

According to one method of carrying out the present invention, the hydrocarbon resin, prepared as described above, is placed in a bomb together with 10% or more (preferably 20 to 50%) of the metal resinate and the bomb is flushed with nitrogen. The bomb is placed in a shaker which provides gentle agitation. The temperature is maintained at 240–280° C. until the desired increase in softening point is attained. The reaction products are then transferred to a stirred reactor and stripped of any unreacted components of the feed. A reaction time of 3 to 6 hours is required.

Another method of carrying out the invention is to place the reactants in a stirred reactor blanketed with nitrogen or some other inert gas at atmospheric pressure. The temperature is maintained at 240–280° C. until the desired increase in softening point is attained.

It is important that the temperature be maintained above about 240° C., since at lower temperatures no appreciable copolymerization takes place. However, care should be taken that the temperature does not exceed the decomposition temperature of the resin. It is also important to maintain the amount of resinate not below 10%, since otherwise the desired softening point is not obtained. It is essential that oxygen be largely excluded if the color of the product is a factor. The presence of oxygen or air will not affect the ultimate softening point.

The following examples will serve to illustrate the mode of operation as well as the advantages of the present invention, though it will be understood that various other embodiments or modifications not specifically illustrated herein are possible without departing from the spirit or scope of the invention.

EXAMPLE 1

A hydrocarbon stream which, according to analysis, consisted approximately of 14% dienes, 43% olefins, and 43% aromatics and saturated hydrocarbons and boiled between 30 and 130° C., prepared by steam cracking of a gas oil, was polymerized in the presence of aluminum chloride at a temperature of 20° C. A hydrocarbon resin was obtained in 25% yield having a softening point of 85° C. (ASTM–E–28–51T) and a color of 9 as determined on the Gardner Colorimeter. The resin was recovered by stripping off the unreacted hydrocarbons by vacuum distillation to a pot temperature of 250–270° C. at 2–5 mm. Hg. Analysis indicated that this resin was substantially of a non-aromatic unsaturated structure, little or none of the aromatic constituents of the feed having entered the composition.

EXAMPLE 2

300 g. of a resin made by the process of Example 1 and 75 g. of zinc resinate were placed in a 1 liter bomb and air swept out by flushing with nitrogen. The product resin had a softening point of 76° C. and a color of 6. The 80–20 blend of resin-zinc resinate before reaction had a softening point of 85° C. and a color of 6. The bomb was placed on a shaker and the temperature held at 280° C. for 3 hours. The bomb contents were cooled somewhat and transferred while molten to a vented, stirred glass reactor blanketed with nitrogen. The temperature was held at 240° C. for 3 hours. 85.5% of the charge to the glass reactor was recovered. This resin had a softening point of 102° C. and a color of 5.

EXAMPLE 3

This cobodied resin was used to make a ⅛" thick floor tile with the following formulation:

| Run No. | Reactants | Time, Hrs. | Temp., °C. | Soft. Pt., °C. Original Mixture of Reactants | Soft. Pt., °C. Modified Resin | Color Original Mixture of Reactants | Color Modified Resin | Percent Yield |
|---|---|---|---|---|---|---|---|---|
| 1 | 80% Resin S. P. 86° C. / 20% Zinc Resinate | 0 | | 97 | | 8 | | |
| | | 1 | 280 | | 105 | | 8 | |
| | | 2 | 280 | | 110 | | 8 | |
| | | 3 | 280 | | 113 | | 8 | |
| | | 6 | 280 | | 118 | | 8 | 86 |
| 2 | 80% Resin S. P. 86°C. / 20% Zinc Resinate | 0 | | 97 | | 8 | | |
| | | 3 | 310 | | 121 | | 10 | 67 |
| 3 | 80% Resin S. P. 86° C. / 20% Zinc Resinate | 0 | | 97 | | 8 | | |
| | | 3 | 240 | | 106 | | 8 | |
| | | 6 | 240 | | 110 | | 8 | 95 |
| 4 | 80% Resin S. P. 79° C. / 20% Zinc Resinate | 0 | | 94 | | 10 | | |
| | | 6 | 200 | | 98 | | 10 | 98 |
| 5 | 80% Resin S. P. 86° C. / 20% Calcium Resinate | 0 | | 95 | | 8 | | |
| | | 2 | 280 | | 151 | | 9 | |
| | | 3 | 280 | | 161 | | 9½ | |
| | | 6 | 280 | | 166 | | 11 | 81.5 |
| 6 | 80% Resin S. P. 86° C. / 20% Aluminum Resinate | 0 | | 95 | | 8 | | |
| | | 2 | 280 | | 117 | | 9 | |
| | | 3 | 280 | | 123 | | 10 | |
| | | 6 | 280 | | 145 | | 15 | 60 |
| 7 | 80% Resin S. P. 79° C. / 20% Copper Resinate | 0 | | 85 | | 17 | | |
| | | 2 | 280 | | 105 | | 16 | |
| | | 3 | 280 | | 109 | | 16 | |
| | | 6 | 280 | | 116 | | 17 | 73 |

| Parts | Material |
|---|---|
| 36 | Asbestos. |
| 36 | Whiting. |
| 3 | Titanox. |
| 15 | Modified Resin. |
| 5 | Plasticizer (Zeco 3270). |

The following evaluations show that this experimental floor tile passes Federal Specifications (#SS-T-306a) set up for the trade:

*McBurney Indentation, Mils*

| 77° F. | | 115° F., 30 Sec. | Flexure, Inches | Impact | Curl |
|---|---|---|---|---|---|
| 1 Min. | 10 Min. | | | | |
| 7 | 11 | 36 | .4 | Pass | 0 |

EXAMPLE 4

A resin prepared according to Example 1, having a softening point of 86° C. and a color of 6 was reacted with 50% of zinc resinate in a stirred reactor blanketed with nitrogen. The temperature was held at 280° C. for 6 hours. 85% of the charge was recovered as a resin having a softening point of 145° C. and a color of 6.

EXAMPLE 5

A resin prepared in accordance with Example 1 having a softening point of 85° C. and a color of 4 was reacted with 10% zinc resinate in accordance with the technique of Example 2. The temperature was held at 280° C. for 6 hours. 88% of the charge was recovered as a resin having a softening point of 87° C. and a color of 5.

EXAMPLE 6

A resin prepared in accordance with Example 1 having a softening point of 88° C. and a color of 3 was reacted with 10% calcium resinate in a stirred reactor blanketed with nitrogen. The 90–10 blend of resin-calcium resinate before reaction had a softening point of 93° C. and a color of 4. The temperature was held at 280° C. for 3 hours. 84% of the charge was recovered as a resin having a softening point of 107° C. and a color of 8.

EXAMPLE 7

Resins prepared in accordance with Example 1 were reacted with 20% of zinc, calcium, aluminum and copper resinates in a stirred reactor blanketed with nitrogen. The following results were obtained:

The above examples show that calcium resinate is more effective than zinc resinate in increasing the softening point but causes the color to go off slightly. The product obtained from aluminum resinate was darker in color than the original and the yields were less than with other metals. Copper resinate caused the color to go off badly and therefore is not suitable. For most purposes therefore zinc, calcium and aluminum resinates appear to be suitable with zinc resinate not affecting the color and calcium resinate yielding products having the highest softening points.

The nature of the present invention having been thus fully set forth and specific examples of the same given, what is claimed as new and useful and desired to be secured by Letters Patent is:

1. In a process for raising the softening point of a hydrocarbon resin prepared by the polymerization of a hydrocarbon fraction boiling between about 20° C. and 280° C. and containing about 10 to 35% conjugated diolefins and 30 to 65% mono-olefins; the improvement which consists in mixing about 100 parts of said resin with at least about 10 parts of a metal resinate selected from the group consisting of zinc, calcium, magnesium, and aluminum resinates, and heating the mixture above about 240° C. but below the decomposition temperature of the resin for a time of about 1 to 6 hours to substantially raise the softening point of the resin.

2. A resin having an elevated softening point produced by the process of claim 1.

3. In a process for raising the softening point of a hydrocarbon resin prepared by the Friedel-Crafts polymerization of a hydrocarbon fraction containing about 10 to 35% conjugated diolefins, 30 to 65% olefins, and up to 60% of aromatics, paraffins and naphthenes, said hydrocarbon fraction boiling between about 20° C. and 280° C. and said polymerization being conducted between about −100° C. and +100° C.; the improvement which consists in mixing the resin with a minority but at least 10% of a metal resinate selected from the group consisting of zinc, calcium, magnesium, and aluminum resinates, and heating the mixture in the substantial absence of oxygen at a temperature in the range of about 240° C. to 310° C. for about 3 to 6 hours.

4. A process according to claim 3 in which the metal resinate is calcium resinate.

5. A process according to claim 3 in which the metal resinate is aluminum resinate.

6. A process according to claim 3 in which the metal resinate is magnesium resinate.

7. A resin having an elevated softening point which has been produced by the process of claim 3.

8. A process according to claim 3 in which the metal resinate is zinc resinate.

9. A resin having an elevated softening point which has been produced by the process of claim 8.

10. The resin of claim 9 wherein the boiling range of the hydrocarbon fraction is between about 30° C. and 130° C., said hydrocarbon fraction has been obtained from a steam-cracking operation, which hydrocarbon fraction comprises between about 14–20% conjugated diolefins and about 43–51% mono-olefins, and the heating step has been performed at temperatures between about 240° C. to 280° C.

References Cited in the file of this patent

UNITED STATES PATENTS

| | | |
|---|---|---|
| 2,193,792 | Wilson | Mar. 19, 1940 |
| 2,346,416 | Cline | Apr. 11, 1944 |
| 2,416,060 | McAlevy et al. | Feb. 18, 1947 |
| 2,453,258 | Pearson | Nov. 9, 1948 |
| 2,610,162 | Hoffmann | Sept. 9, 1952 |

OTHER REFERENCES

Thomas et al., Ind. and Eng. Chem., October 1932, volume 24, No. 10, pages 1125 to 1128 inclusive.